United States Patent [19]

Earl

[11] Patent Number: 4,926,831

[45] Date of Patent: May 22, 1990

[54] FUEL VAPORIZATION APPARATUS

[76] Inventor: Gregory K. Earl, 4005 Saul Rd., Kensington, Md. 20895

[21] Appl. No.: 350,845

[22] Filed: May 12, 1989

[51] Int. Cl.⁵ .......................................... F02M 31/18
[52] U.S. Cl. ...................................... 123/557; 261/67
[58] Field of Search .......................... 123/557, 547; 137/625.31, 625.41, 887, 876; 261/23.2, 67, DIG. 82

[56] References Cited

U.S. PATENT DOCUMENTS

| | | |
|---|---|---|
| 541,773 | 6/1895 | Mead . |
| 1,465,574 | 8/1913 | Bannister . |
| 1,603,660 | 10/1926 | Cassella . |
| 1,608,018 | 11/1926 | Eldred . |
| 1,980,496 | 11/1934 | Musselwhite . |
| 1,997,497 | 4/1935 | Pogue . |
| 2,049,687 | 8/1936 | Chamberlain et al. . |
| 2,306,897 | 12/1942 | Ollig . |
| 2,650,582 | 9/1953 | Green . |
| 2,988,107 | 6/1961 | Rudelick ........................ 137/876 |
| 3,886,919 | 6/1975 | Freeman . |
| 3,916,859 | 11/1975 | Fossum . |
| 3,961,616 | 6/1976 | Brown . |
| 4,015,569 | 4/1977 | Leshner et al. . |
| 4,052,490 | 10/1977 | Fedison ........................... 261/67 |
| 4,106,457 | 8/1978 | Totten et al. . |
| 4,112,889 | 9/1978 | Harpman . |
| 4,139,582 | 2/1979 | Collins . |
| 4,151,821 | 5/1979 | Wichman et al. . |
| 4,212,274 | 7/1980 | Quick . |
| 4,213,433 | 7/1980 | Day . |
| 4,223,652 | 9/1980 | Budnicki . |
| 4,292,257 | 9/1981 | Knowlton ....................... 261/67 |
| 4,349,001 | 9/1982 | Wagner . |
| 4,350,134 | 9/1982 | Sparks . |
| 4,372,280 | 2/1983 | Adams . |
| 4,455,986 | 6/1984 | Finken ........................... 123/557 |
| 4,480,622 | 11/1984 | Hoffman ......................... 123/557 |
| 4,515,135 | 5/1985 | Glass . |
| 4,538,583 | 9/1985 | Earl . |
| 4,622,944 | 11/1986 | Earl . |
| 4,665,879 | 5/1987 | Earl . |

Primary Examiner—Willis R. Wolfe
Assistant Examiner—M. Macy
Attorney, Agent, or Firm—Sherman and Shalloway

[57] ABSTRACT

The present invention is embodied as a fuel vaporization apparatus for use with an internal combustion engine for supplying vaporized fuel to the carburetor so as to provide a more efficient and economical burning of the fuel. The device comprises two exhaust manifolds through which engine exhaust passes, a heat exchange plate attached at the upper end of the exhaust manifold, and a vapor generator chamber attached adjacent the heat exchange plate and connected to the exhaust manifolds. A fuel inlet device delivers atomized fuel into the heated vapor generator chambers before it enters the carburetor. The two vapor generator chambers are connected by a vapor passage element forming one large vapor generator device which entraps a supply of vaporized fuel. A vapor control valve is attached to a side of the vapor passage element and provides a metering of the fuel from the vapor passage element into the venturi stacks of the carburetor in a quantity determined in dependence on an operator command signal such as the pressing of an acceleration pedal. Temperature sensors are provided so as to control the device in a manner that it will be operative only at periods when the vapor generator chambers are heated sufficiently to vaporize the fuel; otherwise, fuel will be delivered to the carburetor in a conventional manner. The vapor control valve provides a unique function in that it allows a single valve to control fuel quantity into both the primary and secondary venturi stacks of the carburetor.

33 Claims, 5 Drawing Sheets

FUEL VAPORIZATION APPARATUS

BACKGROUND OF THE INVENTION

1. Field Of The Invention:

This invention is related generally to a fuel vaporization apparatus and more specifically to an apparatus which provides vaporized fuel to an internal combustion engine so as to provide a more efficient burning of the fuel.

2. Description of the Prior Art:

Various attempts have been made to provide an internal combustion engine with a fuel supply system which increases the efficiency of the burning of the fuel. Applicant is aware of several United States patents which are generally directed to this subject matter. These are briefly discussed below:

First, applicant's own U.S. Pat. Nos. 4,538,583, 4,622,944, and 4,665,879 disclose fuel vaporization apparatus in which the fuel is vaporized before it enters the internal combustion engine by being fed through various amounts and configurations of heat conductive tubing which are exposed to hot exhaust fumes of the engine and by electrical heating elements.

U.S. Pat. No. 4,151,821 to Wichman, deceased et al. discloses an engine fuel supply system in which gas is vaporized in an atomization chamber prior to being fed into the internal combustion engine. The fuel is sprayed by way of jet nozzles into the atomization chamber which is heated by exhaust gases in an exhaust manifold and which is disposed adjacent the atomization chamber and connected thereto. The configuration of the fuel system however is such that its installation would require substantial modification of an existing internal combustion engine.

U.S. Pat. No. 4,106,457 to Totten, et al. discloses a fuel vaporization system in which gas is sprayed into a baffle chamber within which is disposed numerous hollow baffles into which exhaust gases flow and about which the fuel flows in a tortuous path so as to preheat the fuel prior to it entering the internal combustion engine.

U.S. Pat. No. 2,306,897 to Ollig discloses a carburetor which has fuel sprayed into a cylindrical housing which includes a plurality of spaced concentric cylindrical walls. The heated exhaust from the engine is delivered through and about the cylindrical housing so as to heat the fuel prior to its entry into an internal combustion engine.

U.S. Pat. No. 1,997,497 to Pogue discloses a carburetor in which liquid gas is sprayed into an atomization chamber comprising a series of tortuous passages extending from the top to the bottom of the chamber. The passages of the chamber are heated by way of exhaust gases which pass through similar tortuous passages which are interwoven throughout the chamber.

U.S. Pat. No. 1,980,496 to Musselwhite discloses a fuel vaporizer for IC engines in which fuel is sprayed into a vaporization chamber which includes two portions separated from one another by a heat exchange wall. Fuel is sprayed into one of the portions and exhaust gas flows into the other portion so as to heat the wall which separates the two portions and thus to heat the fuel which is sprayed into the first portion.

U.S. Pat. No. 1,603,660 to Cassella discloses a fuel supply system in which fuel is sprayed from an elongated tube onto a plate heated by way of electrical elements. The fuel is then vaporized and sent to the carburetion device of the engine.

While some of these patents teach some aspects of the present invention, applicant believes that none of them disclose, teach or suggest, either singularly or in combination, the entirety of the claimed features

SUMMARY OF THE INVENTION

The invention presently disclosed is embodied in a fuel vaporization apparatus for supplying fuel vapor to a carburetion device of an internal combustion engine. An electric fuel pump provides liquid fuel to two atomization foggers which present atomized fuel into two vapor generation chambers. The vapor generation chambers are disposed adjacent to exhaust manifolds and separated therefrom only by a single heat exchange plate. Upon atomized fuel being presented into the vapor generation chamber and upon a small amount of air being provided thereinto by an air pump, the fuel is vaporized due to the heat exchanged from the exhaust manifold into the generator chamber and the additional air pressure provided by the pump. A vapor passageway is removably installed between the two generator chambers. A control valve is attached to the vapor passageway such that it is in vapor communication therewith. The valve is controlled by means of an operator command signal, such as depression of the acceleration pedal, so as to selectively meter the amount of vaporized fuel being fed into the venturi stacks of the carburetion device.

The control valve includes a fuel block and a spool and provides metered flow through its primary ports into the primary venturi stack of the carburetor for normal amounts of required acceleration. When larger amounts of acceleration are required it further provides metered flow through its secondary port into the secondary venturi stacks of the carburetor. An engine idle condition is provided by allowing a steady flow of fuel vapor to pass from the vapor generator chambers through a bypass solenoid valve and directly into the engine manifold.

Temperature sensors are provided in the vapor generator chambers. One of these sensors provides a signal to the electric fuel pump and to the air pump when a minimum temperature has been attained in the generator chambers so as to activate the fuel pump and the air pump and thus begin delivery of atomized fuel and additional air pressure to the generator chambers. A second temperature sensor provides a shut down signal to the electric fuel pump and to the air pump when the temperature exceeds a maximum temperature. A high fuel level sensor may also be provided in the generator chambers to shut down the fuel pump as a safety measure in case a malfunction were to cause liquid fuel to build up in the generator chambers to an excessive level.

The vaporization apparatus of the present invention is configured in a manner which allows it to be installed on a conventional internal combustion engine with very little modification thereof. Furthermore, it is arranged such that the vapor passageway, the spool valve, and the carburetor can be easily removed without removal of the remainder of the system.

The apparatus disclosed herein also includes a cut-off solenoid valve which directly supplies fuel from the fuel tank to the carburetor for operation of the internal combustion engine during periods when the vaporization apparatus is not operational, such as before the preset minimum temperature is attained in the vapor generator chambers and upon occurrence of a preset maximum temperature being attained in the vapor generator chambers.

Accordingly, it is a first object of the present invention to provide an improved fuel supply system for an internal combustion engine.

It is a further object of the invention to provide a fuel supply system for an internal combustion engine which increases the efficiency in the burning of the fuel-air mixture supplied thereto.

It is a still further object of the present invention to increase the efficiency of the burning of the fuel of the internal combustion engine through the use of a pair of vapor generator chambers which are heated to such an extent by the exhaust gases that when fuel is sprayed thereinto, it is immediately vaporized substantially before coming into contact with the walls of the chambers.

It is yet another object of the invention to provide an efficient fuel system which can be easily installed on a conventional internal combustion engine.

A further object of the present invention is to provide easy removability of portions of the apparatus which may need periodic servicing.

A still further object of the present invention is to provide temperature sensors which control the start up and shut down of the electric fuel pump and which operate a solenoid valve which controls direct flow of fuel to the carburetor from the fuel tank.

A further object of the present invention is to provide the vaporization apparatus with a unique spool valve arrangement which allows, not only metering of normal flow of fuel vapor for normal acceleration requirement, but also unusually large amounts of fuel vapor flow for unusually large acceleration requirements.

These and other objects, advantages, and features of the present invention will become apparent from the following detailed description of the preferred embodiment when considered in conjunction with the accompanying drawings.

DETAILED DESCRIPTION OF THE PREFERRED EMBODIMENT

Figure 1:
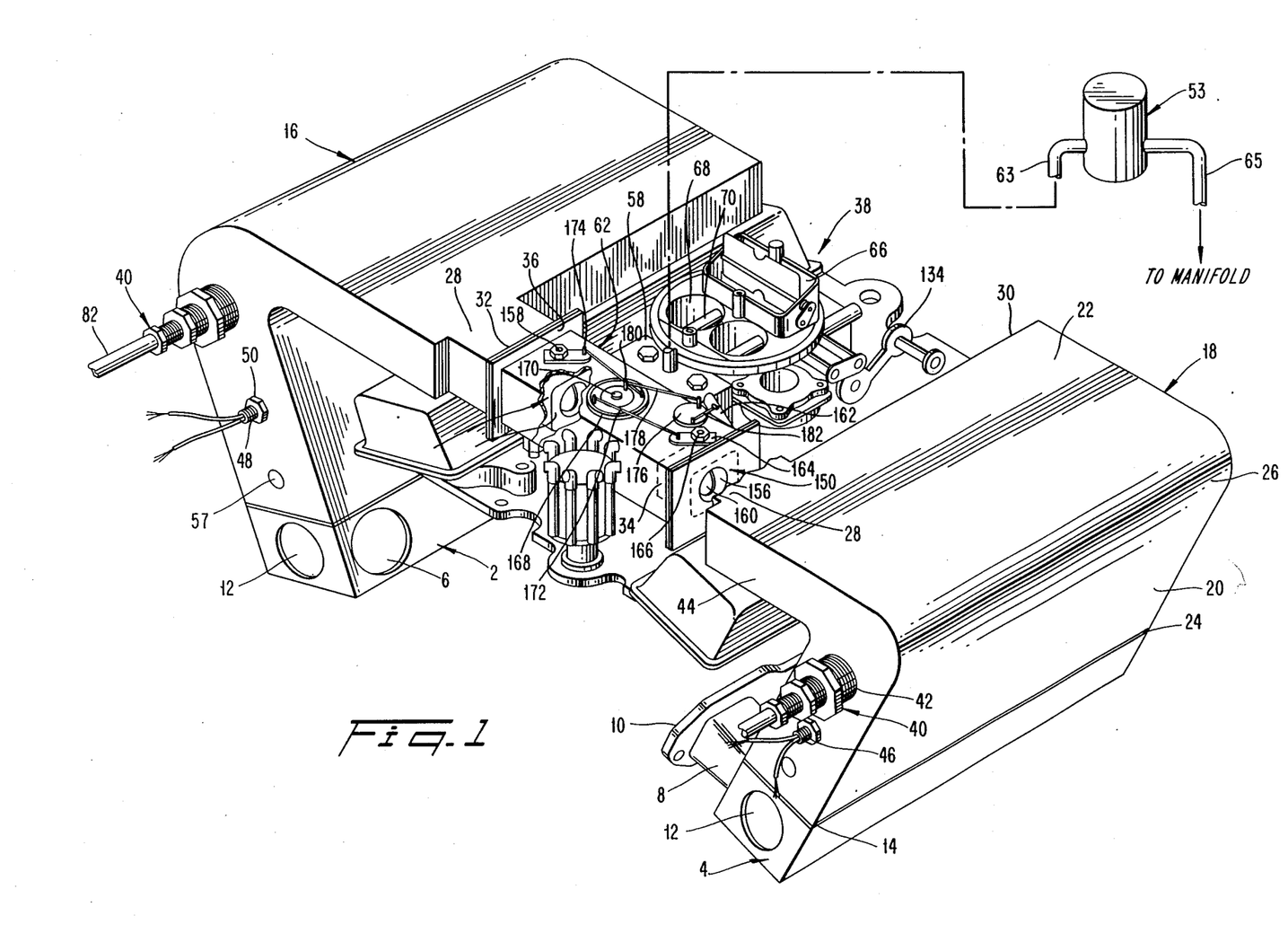
FIG. 1 shows a perspective view of the present invention.
Figure 2:
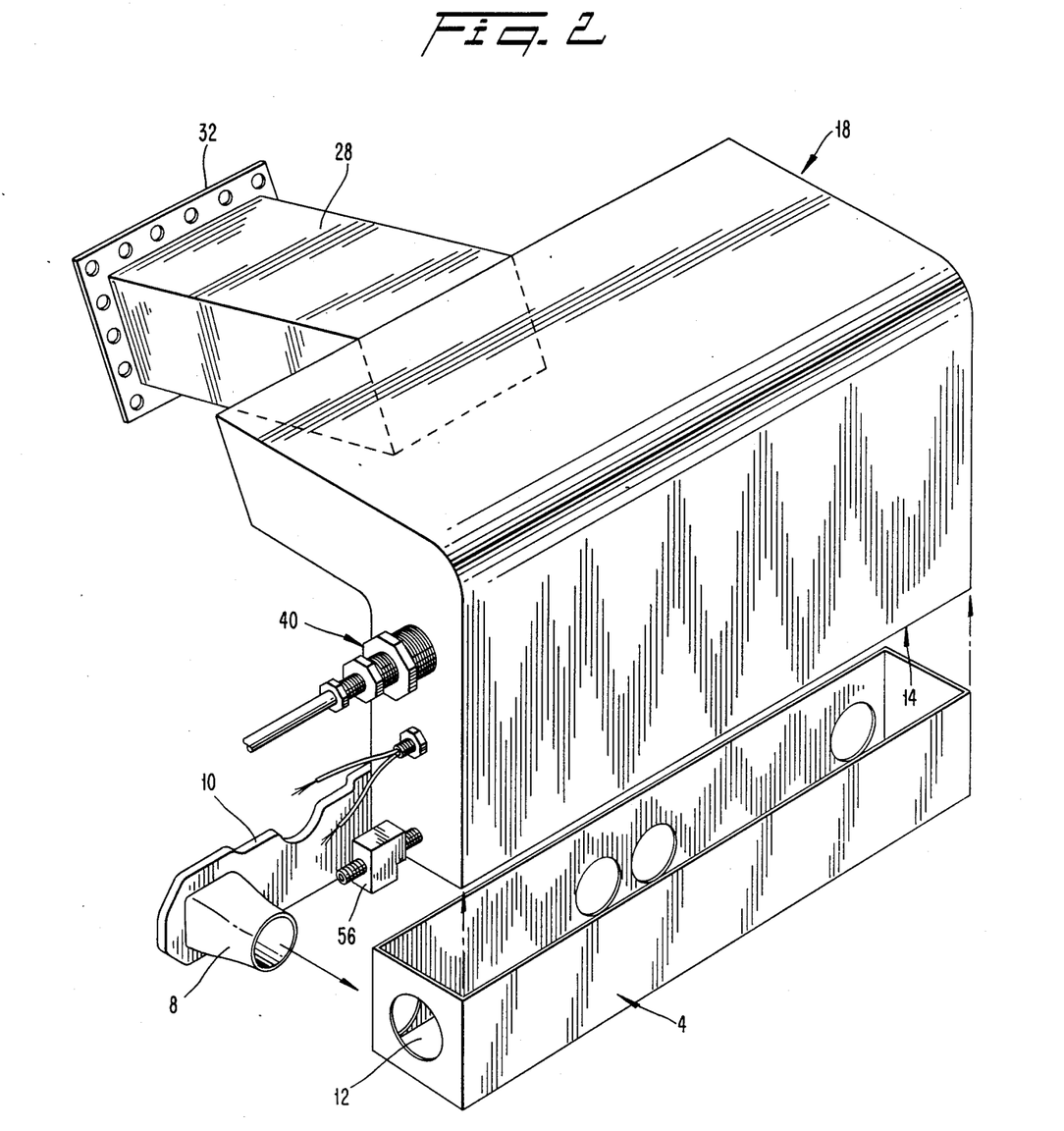
FIG. 2 shows an exploded perspective view of a portion of the present invention with parts thereof cut away for clarity.

With reference first to FIGS. 1 and 2, the invention is shown as including exhaust manifolds 2, 4 within which exhaust gases are collected. Exhaust inlet ports 6 are formed along one side of each of the exhaust manifolds 2, 4. Exhaust tubes 8 are welded flush to each of the exhaust inlet ports 6 and an exhaust manifold flange 10 is welded to each set of exhaust tubes 8. The flange 10 is adapted to bolt to the engine at the same location as a conventional exhaust manifold would normally be bolted to the engine. Exhaust outlet ports 12 are formed at each end of each exhaust manifold 2, 4 through which the exhaust is vented to the atmosphere through a standard exhaust system.

A heat exchange plate 14 forms the upper wall of each of the exhaust manifolds 2, 4 and separates each of the exhaust manifolds from a corresponding vapor generator chamber 16, 18.

Each of the vapor generator chambers is connected to and adjacent with its corresponding exhaust manifold 2, 4. The chambers 16, 18 are generally L-shaped in cross section such that they include a generally vertical leg 20 which connects at its lower end 24 with the exhaust manifold 2, 4 and a generally horizontal leg 22 integral with the upper end 26 of the vertical leg 20. Although in the preferred embodiment the single heat exchange plate 14 for each exhaust manifold and vapor generator chamber combination is the only necessary heat exchange surface, it is contemplated that if additional heat exchange surfaces are necessary in a specific system, upright fins with apertures therethrough can be attached in any known heat conductive manner, such as by welding, to the heat exchange plate.

Each of the vapor generator chambers 16, 18 includes a protruding duct 28 attached in a known manner at the free end 30 of the generally horizontal leg 22 of the L-shaped chamber. At the end of the protruding duct 28, a flange 32 is formed about the duct 28. These flanges provide a removable connection for a vapor passage element 34 to be disposed between the respective ones of the protruding ducts of the vapor generation chambers. Each end of the vapor passage element includes a flange 36 similar to that of the protruding ducts for engagement therewith by means of fastening elements, such as bolts.

The vapor passage element 34 is in vapor communication with each of the vapor generation chambers 16, 18 by way of butterfly valves 150, 152 disposed within the respective ends of the vapor passage element. The butterfly valves 150, 152 are formed in the vapor passage element as block elements 154 with longitudinal tubular passages 156 therein. Vertical pivot shafts 158 are disposed through the block and tubular passage, and butterfly elements 160 are attached to the pivot shaft such that rotation of the pivot shafts 158 cause rotation of the butterfly elements between positions in which vapor is communicated through the tubular passages and positions in which the tubular passages are closed and do not allow vapor communication from the generator chambers 16, 18 into the vapor passage element 34. A linkage system for use in providing controlled throttling with the butterfly valves will be described later.

Thus, it can be seen that the combination of the two vapor generator chambers 16, 18 and the vapor passage element 34 provides a chamber within which fuel vapor gases are entrapped during operation of the apparatus for their delivery into the carburetor 38 of an internal combustion engine.

A fuel inlet device 40 is attached through an aperture 42 in the side 44 of each vapor generation chamber 16, 18 so as to supply atomized fuel into the heated chambers. Details of these fuel inlet devices 40 will be described later.

Also shown in FIGS. 1 and 2 are temperature sensors 46, 48 which are disposed through apertures 50 in the sides 44 of each of the vapor generation chambers 16, 18 so as to extend thereinto. One of these temperature sensors 46 detects when the vaporization chambers 16, 18 reach a minimum temperature adequate for start up of the system. Prior to the temperature in the vapor generation chambers 16, 18 reaching the requisite minimum temperature, fuel flows from the fuel tank through a cut-off solenoid valve 54 and into the carburetor 38 in a conventional manner. Once the requisite minimum temperature is reached, the temperature sensor 46 sends a signal to a cut-off solenoid valve 54 to cause it to close, to a bypass solenoid valve 53 to cause it to open and to the system's fuel pump 52 (see FIG. 5) to thereby cause fuel to be sent to and through the fuel inlet devices 40. Thus, during the normal operation of the system vaporized fuel will flow from the vapor generator chambers, through the bypass solenoid valve 53 and into the engine manifold 37 to provide an idle condition of the engine. Also, during normal operation of the system, fuel vapor will flow from the vapor generator chambers, through and under control of the vapor control valve 58, and into the carburetor or other carburetion device.

A second temperature sensor 48 is provided so as to detect when a maximum temperature is reached, above which running of the system is undesirable because of inefficiencies and possible dangers. Thus, upon the system reaching the maximum temperature, the second sensor 48 sends a shut-down signal to the fuel pump 52, as well as a signal to the bypass solenoid valve 53 to close and a signal to the cut-off solenoid valve to open. The temperature sensors 46, 48 extend well into the vapor generator chambers 16, 18 so that the temperature sensed is reflective of the actual operating temperature of the device. Although various types of temperature sensors will provide adequate results, the temperature sensor used in the preferred embodiment for detecting the minimum temperature and starting up the operation of the device is commercially available from Vulcan Cal Stat as model no. 1E1B2, and the temperature sensor used in the preferred embodiment to detect the maximum system temperature and for shutting down the system is available from Vulcan Cal Stat as model no. 1E2B2.

When the engine is shut down by opening of the ignition switch 59, the bypass solenoid valve 53 is closed and fuel vapor is prevented from passing in either direction between the vapor generator chambers and the engine manifold.

The bypass solenoid valve 53 is of any conventional on-off type suitable to the present invention. It is connected to the vapor generator chambers 16, 18 via a vapor line 63 which connects to a passage 61 formed in the block 84 of the vapor control valve 58 (as described later). Vapor exits from the bypass solenoid valve 53 through a vapor line 65 which extends beneath the carburetor directly to a fitting (not shown) disposed in an aperture in the engine manifold.

In order to provide proper and complete vaporization of the atomized fuel entering the vapor generator chambers, it is necessary to provide additional air pressure via a small low pressure air pump 55 into the vapor generator chambers. The pump 55 is connected via fittings 56 (see FIG. 2) which are disposed within apertures 57 in sides of the chambers 16, 18. The pump may be any suitable air pump which is able to deliver pressure in the range of 0–20 pounds per square inch, but the preferred operating pressure is just slightly above atmospheric pressure (e.g. 15–17 p.s.i.). Operation of the air pump is controlled by a conventional pressure switch 51 which will deactivate the pump upon the occurrence of adequate pressure in the chambers 16, 18.

A vapor control valve 58 is attached at its inlet face 60 to a side 62 of the vapor passage element 34. A gasket is provided between the valve 58 and the vapor passage element 34 to prevent vapor leakage from the junction between the two elements. The valve body can be attached to the vapor passage element by any known means. However, in the preferred embodiment, it is contemplated as being attached with bolts. The outlet face 64 of the valve 58 is attached to the carburetor 38, and a gasket is disposed therebetween to prevent leakage. The valve 58 allows metered passage of the fuel vapor from the vapor passage element 34 into the carburetor's venturi stacks 66, 68. Details of the vapor control valve 58 will be described later.

Figure 6:
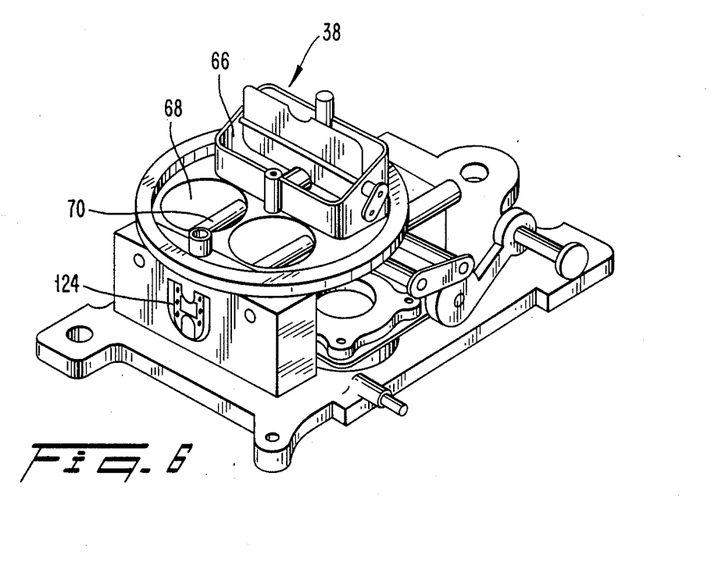
FIG. 6 shows a perspective view of a carburetor modified slightly for use with the present invention.
Figure 7:
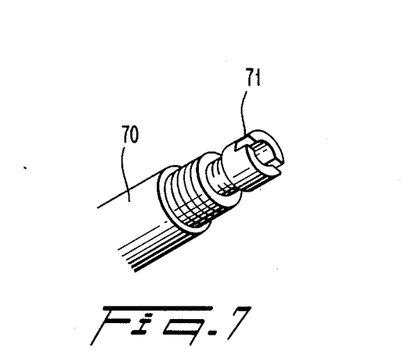
FIG. 7 shows an enlarged perspective view of a vapor tube as used in the carburetor of FIG. 6.
Figure 8:
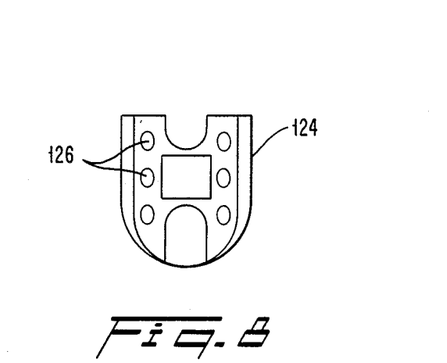
FIG. 8 shows an enlarged elevation view of a depression in the wall of the modified carburetor of FIG. 6.
Figure 9:
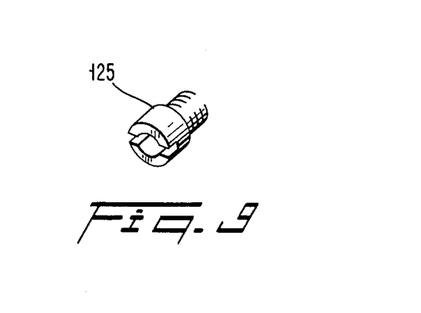
FIG. 9 shows an enlarged perspective view of a jet.
Figure 10:
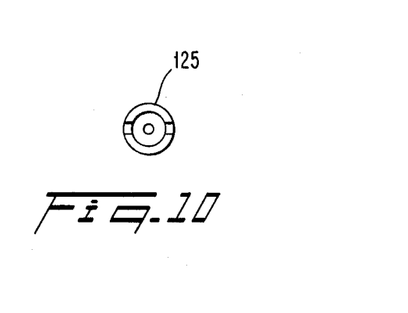
FIG. 10 shows a front elevation view of the jet of FIG. 9.

The carburetor 38 contemplated for use with the present invention is of the type having primary 66 and secondary 68 venturi stacks. Vapor tubes 70 extend through and across the secondary venturi stacks 68 so as to deliver vapor from primary outlet ports of the control valve 58 to the primary venturi stack. A jet 71 is screwthreaded into an end of each of the vapor tubes 70 so as to provide a jet stream of vapor into the primary venturi stack. Although the carburetion device utilized in the preferred embodiment is a carburetor, it is contemplated that the system can be used with fuel injection systems of either the mechanical or electrical type.

Figure 3:
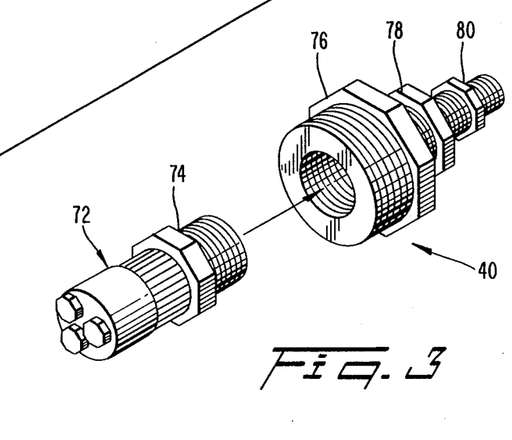
FIG. 3 shows an exploded view of the fuel inlet device of the present invention.

Reference will now be made to FIG. 3 for describing details of the fuel inlet device 40. The device includes a fogger 72 which is described in U.S. Pat. No. 2,651,547, the disclosure of which is incorporated herein by reference. Attached to the fogger is a ⅜ inch pipe fitting 74 which includes a nut-like flange thereon disposed adjacent the inlet end of the fogger 72. The opposite end of the ⅜ inch pipe fitting is threaded and disposed through the aperture 42 in the side of the vapor generator chamber 16, 18 such that the fogger is disposed within the chamber. Threaded onto the threaded portion of the ⅜ inch pipe fitting 74 from the outside of the vapor generation chamber is a steel hex plug 76 drilled and tapped at each end and including a nut-shaped flange. A ⅜ inch to ⅛ inch reducer 78 is inserted in the end of the steel hex plug 76 opposite the fogger 72. Attached within this reducer 78 is a ⅛ inch nipple 80 which provides a connection for the fuel line 82. This arrangement allows easy removal of the fogger for cleaning and servicing. While these specific components and the dimensions thereof are utilized in the preferred embodiment, it is contemplated that various arrangements may be used which would provide similar advantages.

Figure 4:
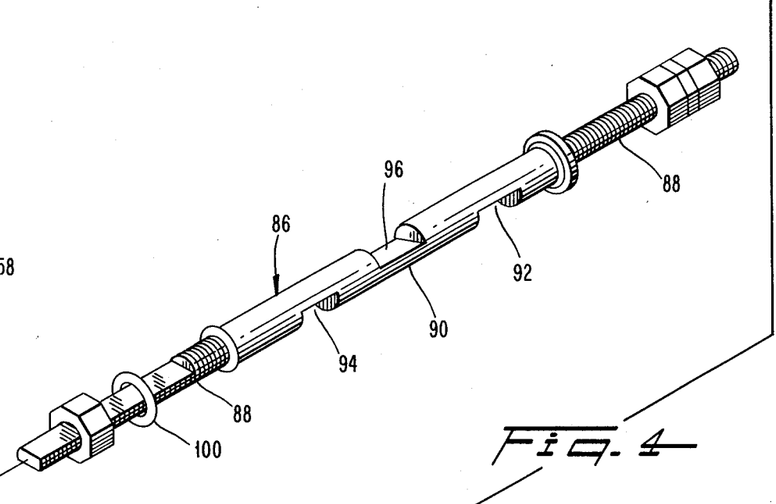
FIG. 4 shows an exploded perspective view of the fuel vapor control valve of the present invention.

Details of the vapor control valve 58 will now be described with reference to FIG. 4. The vapor control valve includes a fuel block 84 and a spool 86. The spool is rod-shaped and includes threaded ends 88 and a central portion 90 which includes fuel passage cut-outs 92, 94, 96 along diametric sides of the spool. The spool is inserted into a spool bore 98 which extends lengthwise through the fuel block 84. The spool 86 extends outwardly from each end of the fuel block 84 and is axially fixed within the spool bore 98 by way of O-rings 100 and lock nuts 102. Primary inlet ports 104 are formed through the inlet face 60 of the fuel block 84 substantially perpendicular to and in communication with the spool bore 98. Vertical bores 106 are formed through the top face 108 of the fuel block 84 downwardly such that they communicate with the spool bore 98 and with the primary inlet ports 104. Primary outlet ports 110 are formed through the outlet face 64 of the fuel block 84 substantially perpendicular with the vertical bores 106 and in communication therewith. The primary outlet ports 110 are substantially parallel with the primary inlet ports 104 but offset vertically therefrom. An L-shaped passage 61 is formed so as to extend from the top face of the block 84 to the inlet face 60 and to allow for direct passage of fuel vapor from the vapor passage element 34 to the bypass solenoid valve 53.

A secondary inlet port 112 is formed through the inlet face 60 of the fuel block 84 substantially perpendicular with the spool bore 98 and in communication therewith and a secondary outlet port 114 is formed through the outlet face 64 of the fuel block 84 substantially collinear with the secondary inlet port 112 and in communication therewith.

Vapor adjustment screws 116 are inserted into the vertical bores 106 which are threaded internally at least at their top ends. Although various types of adjustment screws may be used, in the preferred embodiment, each of the screws is formed of a threaded lug 118 which is inserted into the vertical bore 106 and a nut 120 which is threaded thereonto. A washer 122 is disposed between the nut and the upper face of the fuel block 84. Thus, by turning of the adjustment nut 120, the lug 118 may be axially advanced or retracted from the vertical bore 98 so as to provide variable amounts of communication between the vertical bore 106 and the primary outlet ports 110.

The cut-outs 92, 94, 96 formed in the central portion 90 of the spool 86 align along the longitudinal axis of the spool 86 with the inlet ports 104, 112. The two primary cut-outs 92, 94 are formed on one diametric side of the spool and a central secondary cut-out 96 is formed on a diametric side of the spool opposite the primary cut-outs 92, 94. This specific configuration of the spool 86 and the fuel block 84 provides that, during normal operation, the fuel vapor will pass through the primary inlet ports 104, through the primary cut-outs 92, 94, up the vertical bores 106, out through the primary outlet ports 110, through the vapor tubes 70, and into the primary venturi stacks 66 of the carburetor 38. Slight rotation of the spool 86 within the fuel block 84 will vary the amount of vapor sent therethrough. When a significantly larger amount of acceleration is necessary, the spool 84 is rotated such that the secondary cut-out 96 allows the vapor to pass through the secondary inlet 112 and outlet 114 ports and into the secondary venturi stacks 68 of the carburetor so as to allow a maximum amount of fuel vapor into the carburetor. In the preferred embodiment, the secondary outlet port 114 of the control valve delivers the fuel vapor into a small chamber 124 formed by a depression in the side of the carburetor (see FIG. 6). From this small chamber, the fuel vapor flows through a plurality of jets 125 screwthreaded into a corresponding plurality of apertures 126 bored through the side walls of the secondary venturi stacks (preferably three apertures are formed through the wall of each secondary venturi stack).

Backfire screens 128 are inserted into the inlet ports 104, 112 of the fuel block 84 so as to prevent backfire from coming into contact with the vapor stored in the vapor passage element 34 and the vapor generator chambers 16, 18. A backfire screen (not shown) may also be inserted into the inlet side of the vapor passage 61.

A linkage system for controlling operation of the butterfly valves 150, 152 will now be described with reference to FIG. 1. As stated previously, the butterfly elements 160 are rotated by way of pivot shafts 158. The pivot shafts 158 are fixedly attached to linkage plates 164 by way of nuts 166 above and below the linkage plates or by any other suitable means. A main circular linkage 168 is rotatably disposed at an upper central surface of the vapor passage element 34 by way of a pivot 170. Linkage rods 172 are pivotally connected by way of ball socket ends 174 between the main circular linkage 168 and respective ones of the linkage plates 164 such that the linkage plates 164, and thus the pivot shafts 158 and butterfly elements 160, are forced to rotate upon rotation of the main circular linkage 168. A secondary circular linkage 176 is also rotatably disposed on the upper surface of the vapor passage element 34 and is connected to the main circular linkage 168 by way of a further linkage rod 178 having ball socket ends 180 such that rotation of the secondary circular linkage 176 will force corresponding rotation of the main circular linkage 168, and thus rotation of the linkage plates 164, pivot shafts 158 and butterfly elements 160. Finally, the secondary circular linkage 176 is connected to a valve control arm 162 by way of a control linkage rod 182 which has ball socket ends. The valve control arm 162 is fixedly attached to the spool 86 of control valve 58 such that it extends radially from an end thereof. Although ball socket ends are utilized in the preferred embodiment to provide pivot connections between the various linkage rods, circular linkages and the valve control arm, it is contemplated that any suitable pivot connection, such as a straight pivot pin may be used.

Thus, the butterfly valves 150, 15 are actuated simultaneously with the spool valve 86 of the vapor control valve 58. The interposition of the butterfly valves between the vapor generation chambers 16, 18 and the vapor passage element prevents an excessive pressure build-up within the vapor passage element. This is necessary so that the engine is not suddenly flooded upon initial opening of the vapor control valve 58, and so that throttling of the fuel vapor between the vapor generation chambers and the vapor passage element is provided.

A linkage 130 (see FIG. 5) will operatively connect the spool of the control valve, and thus the butterfly valves, with the acceleration pedal 132 or other control element of the vehicle. Although various linkages may be used to control the valve, in the preferred embodiment the linkage comprises a conventional linkage (not shown) extending between the acceleration pedal and a control arm 134 of the carburetor, and a rod member (not shown) with ball joints at each end thereof extending between the carburetor control arm 134 and the valve control arm 162 (see FIG. 1) extending radially from an end of the spool 86 of the control valve 58.

Figure 5:
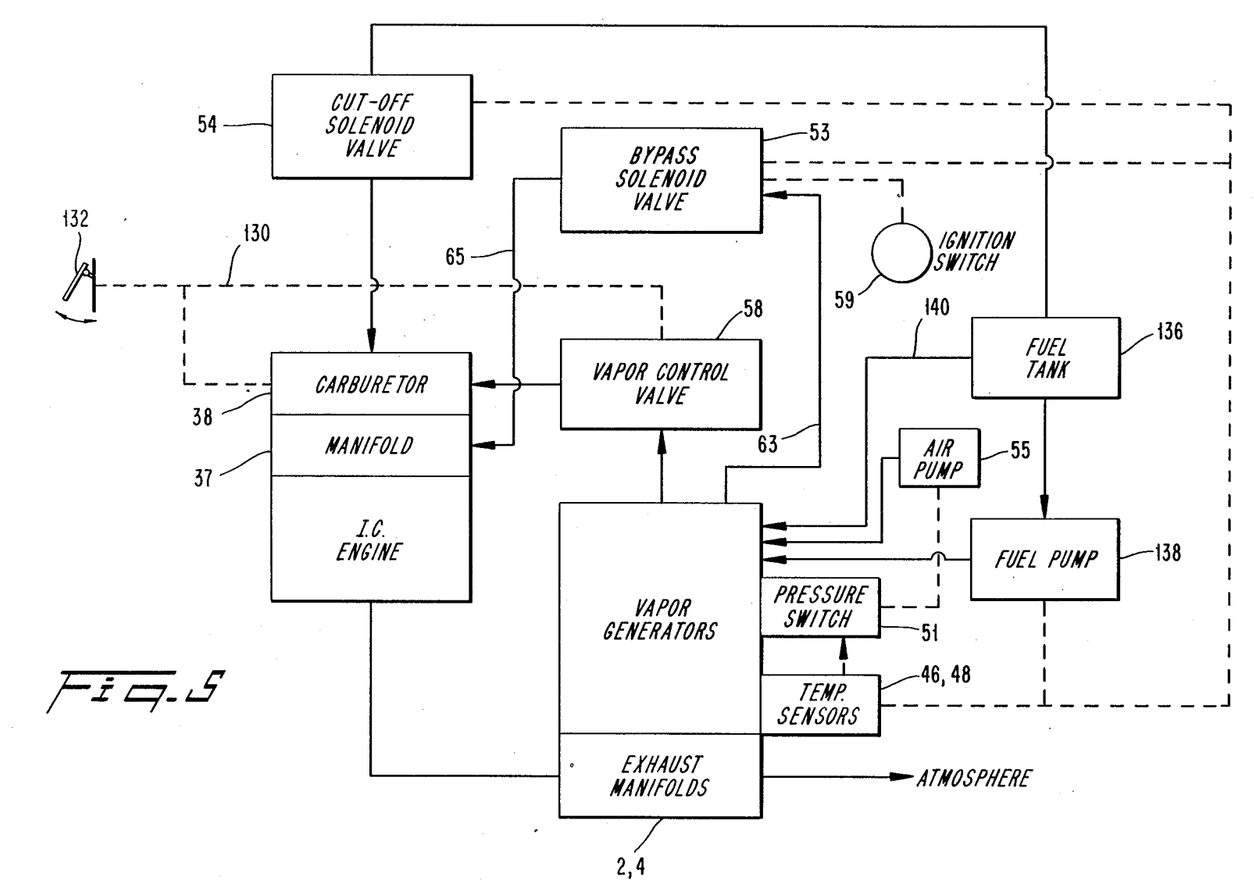
FIG. 5 shows a schematic diagram of the various components of the present invention.

Operation of the present invention will now be described with particular reference to FIG. 5. When the internal combustion engine is first activated, fuel passes from the fuel tank 136 through the cut-off solenoid valve 54 and into the carburetor 38 of the internal combustion engine. Exhaust gases from the engine pass through the exhaust tubes 8 into the exhaust manifolds 2, 4 where they cause heating of the heat exchange plate 14 and thus of the vapor generator chambers 16, 18. Upon the vapor generator chambers 16, 18 reaching a specified minimum temperature (preferably about 250° F., but possibly as low as 180° F.), the temperature sensor 46 will send an activation signal to the electric fuel pump 138 and a signal to the valve 54 to cause it to close such that fuel will not be delivered directly to the carburetor. At the same time, the temperature sensor 46 will send a signal to open a bypass solenoid valve 53 which delivers fuel vapor from chambers 16, 18 directly to the engine manifold 37 to provide engine idle. The electric fuel pump 138 will simultaneously begin delivering fuel from the fuel tank 136 through the fuel inlet device 40 into the vapor generator chambers 16, 18, where it will be atomized by the fogger 72 and changed into a vapor state due to the heat produced by the exhaust gases and the additional air pressure delivered by the air pump 55. After such vaporization, the vapor will be pressurized to about 1 to 2 pounds per square inch above atmospheric pressure throughout the vapor generator chambers 16, 18. A linkage 130 will connect the vehicle's acceleration pedal 132 with the spool 86 of the vapor control valve 58, and with the linkage controlling the butterfly valves 150, 152 between the vapor generation chambers and the vapor passage element 34, such that movement of the accelerator pedal will provide rotation of the spool 86 within the fuel block 84 and rotation of the butterfly elements 160 of the butterfly valves. Vapor will then pass from the vapor generation chambers 16, 18, through the tubular passages 156 throttled by butterfly elements 160, into the vapor passage element 34, through the vapor control valve 58 and into the venturi stacks 66, 68 of the carburetor 38.

The introduction into the carburetor venturi stacks of vaporized fuel rather than liquid fuel provides a more efficient burning of the fuel and greater fuel economy. If the temperature within the vapor generator chambers 16, 18 reaches a predetermined maximum temperature (preferably about 400° F., but no higher than 600° F.) the temperature sensor 48 will send a signal to the electric fuel pump 138 to shut down, to the bypass solenoid valve 53 to close and to the cut-off solenoid valve 54 to open and allow fuel to flow therethrough from the fuel tank 136 directly to the carburetor 38.

It is also contemplated that a fuel vapor line 140 may be run from an upper extreme of the fuel tank 136 to the vapor generator chambers 16, 18 such that vapor produced within the fuel tank itself will be delivered to the vapor generator chambers so as to provide additional fuel vapor thereto. The pressure produced in the fuel tank itself is greater than that produced in the vapor generation chambers and thus the vapor will be forced through the vapor line 140 from the fuel tank to the vapor generator chambers.

Although the components of the system may be formed of any material which has sufficient strength and heat resistance properties, in the preferred embodiment each of the components subject to high heat are formed of stainless steel. It is contemplated, however, that the components may also be formed of aluminum.

Although a preferred embodiment of the fuel evaporation apparatus has been disclosed hereinabove, various modifications, alterations and changes will become apparent to those skilled in the art. Accordingly, it is intended that the invention should not be limited to the embodiments specifically described above, but rather that the invention disclosed herein should be limited only by the scope of the appended claims.

What is claimed is:

1. A vaporization apparatus for use in the fuel supply system of an internal combustion engine, comprising:
   vapor generator means for generating fuel vapor;
   fuel inlet means for introducing fuel into said vapor generator means in a mist form;
   exhaust collection means, connected adjacent said vapor generator means, for collecting heated exhaust from said internal combustion engine and providing heat to said vapor generator means; and
   valve means, connected to said vapor generator means, for selectively providing said fuel vapor to a carburetion device of said internal combustion engine;
   said vapor generator means comprising first and second vapor generator chambers and a vapor passage element connected between and in vapor communication with said first and second vapor generator chambers.

2. A vaporization apparatus as recited in claim 1, wherein said vapor passage element is removably connected to each of said vapor generator chambers.

3. A vaporization apparatus as recited in claim 2, wherein said vapor passage element includes first and second ends, said first end of said vapor passage element having a first flange, extending peripherally thereabout and engaged with a second flange formed on said vapor generator chamber, and said second end of said vapor passage element having a third flange, extending peripherally thereabout and engaged with a fourth flange formed on said second vapor generator chamber.

4. A vaporization apparatus as recited in claim 1, wherein said vapor passage element includes a first end and a second end, said first end of said vapor passage element being connected with said first vapor generator chamber and said second end of said vapor passage element being connected with said second vapor generator chamber.

5. A vaporization apparatus as recited in claim 4, further comprising throttle means for selectively and variably throttling fuel vapor from said vapor generator means into said vapor passage element.

6. A vaporization element as recited in claim 5, wherein said throttle means comprises first and second butterfly valves disposed in said vapor passage element disposed, respectively, between said vapor passage element and said first vapor generator chamber and between said vapor passage element and said second vapor generator chamber.

7. A vaporization apparatus as recited in claim 6, further comprising means for controlling operation of said throttle means and operation of said valve means simultaneously.

8. A vaporization apparatus as recited in claim 7, wherein said operation controlling means comprises a control arm attached to said valve means and a linkage connecting said control arm and said throttle means.

9. A vaporization apparatus as recited in claim 1, wherein said valve means is connected in vapor communication with said vapor passage element.

10. A vaporization apparatus as recited in claim 9, wherein said valve means includes a front face and a rear face, said front face of said valve means being attached adjacent a side wall of said vapor passage element.

11. A vaporization apparatus as recited in claim 10, wherein said rear face of said valve means is attached to said carburetion device.

12. A vaporization apparatus as recited in claim 1, wherein said exhaust collection means comprises first and second exhaust manifolds, said first exhaust manifold being connected adjacent said first vapor generator chamber and said second exhaust manifold being connected adjacent said second vapor generator chamber.

13. A vaporization apparatus as recited in claim 1, wherein each of said first and second vapor generator chambers is substantially L-shaped and includes a first leg and a second leg, said first and second legs being in vapor communication.

14. A vaporization apparatus as recited in claim 13, wherein said vapor passage element includes a first and a second end, said first end of said vapor passage element being connected with said first leg of said first vapor generator chamber and said second end of said vapor passage element being connected with said first end of said second vapor generator chamber; and
   said exhaust collection means includes first and second exhaust manifolds, said first exhaust manifold being connected with said second leg of said first vapor generator chamber and said second exhaust manifold being connected with said second leg of said second vapor generator chamber, each said exhaust manifold being separated from its corresponding said vapor generator chamber by a heat exchange plate;
   such that heat radiates upwardly from said heat exchange plate to heat the entirety of said vapor generator means.

15. A vaporization apparatus as recited in claim 1, further comprising control means for controlling supply of the fuel vapor into said fuel inlet means.

16. A vaporization apparatus as recited in claim 15, wherein said control means includes heat sensor means for detecting temperature within said vapor generator means and controlling the supply of fuel to said fuel inlet means in dependence thereon.

17. A vaporization apparatus for use in the fuel supply system of an internal combustion engine, comprising:
   vapor generator means for generating fuel vapor;
   fuel inlet means for introducing fuel from a fuel tank into said vapor generator means;
   exhaust collection means, connected adjacent said vapor generator means, for collecting hot exhaust from said internal combustion engine and providing heat to said vapor generator means;
   valve means, connected to said vapor generator means, for selectively providing said fuel vapor to a carburetion device of said internal combustion engine;
   said valve means comprising a spool valve.

18. A vaporization apparatus as recited in claim 17, further comprising direct vapor supply means, connected between an upper portion of said fuel tank and said vapor generator means, for supplying fuel vapor directly from said upper portion of said fuel tank to said vapor generator means.

19. A vaporization apparatus as recited in claim 17, wherein said spool valve comprises a fuel block and an elongated spool rotatably disposed therein.

20. A vaporization apparatus as recited in claim 17, further comprising throttle means for throttling fuel vapor between said vapor generator means and said valve means.

21. A vaporization apparatus as recited in claim 19, wherein said spool is substantially rod-shaped with at least one primary cut-out formed in one diametric side of said spool in selective registry with at least one corresponding primary inlet port formed in said fuel block.

22. A vaporization apparatus as recited in claim 21, wherein at least one bore is formed in said fuel block substantially perpendicular to and in selective registry with both said at least one primary inlet port and said at least one primary cut-out, and at least one primary outlet port is formed in said fuel block in vapor communication with and substantially perpendicular to said at least one bore and substantially parallel to but offset from said at least one primary inlet port.

23. A vaporization apparatus as recited in claim 22, wherein one end of said at least one bore opens at a surface of said fuel block and receives an adjusting means for adjusting the amount of vapor communication from said at least one bore to said at least one primary outlet port.

24. A vaporization apparatus as recited in claim 22, wherein said spool includes a secondary cut-out formed in a diametric side of said spool substantially diametrically opposite said at least one primary cut-out and in selective registry with a secondary inlet port and a secondary outlet port formed in said fuel block.

25. A vaporization apparatus as recited in claim 24, wherein said secondary inlet port is substantially collinear with said secondary outlet port.

26. A vaporization apparatus as recited in claim 17, wherein said spool valve comprises primary metering means for selectively metering fuel vapor from said vapor generator means to a primary venturi stack of said carburetion device in dependence on an operator acceleration signal, and secondary metering means selectively metering fuel vapor from said vapor generator means to a secondary venturi stack of said carburetion device in a greater quantity than metered by said primary metering means in dependence on a second operator acceleration signal.

27. A vaporization apparatus as recited in claim 25, wherein said at least one cut-out comprises two cut-outs, said at least one primary inlet port comprises two primary inlet ports, said at least one bore comprises two bores, and said at least one primary outlet port comprises two primary outlet ports.

28. A valve for use in metering fuel to a carburetion device of an internal combustion engine, comprising:
   a fuel block;
   an elongated spool rotatably disposed in said fuel block;
   said spool being substantially rod-shaped with at least one primary cut-out formed in one diametric side of said spool in selective registry with at least one corresponding primary inlet port formed in said fuel block;
   at least one bore formed in said fuel block substantially perpendicular to and in selective registry with both said at least one primary inlet port and said at least one primary cut-out;
   at least one primary outlet port formed in said fuel block in communication with and substantially perpendicular to said at least one bore and substantially parallel to but offset from said at least one primary inlet port; and
   said spool further including a secondary cut-out formed in a diametric side of said spool substantially diametrically opposite from said at least one primary cut-out and in selective registry with a secondary inlet port and a secondary outlet port formed in said fuel block, said secondary inlet port being substantially collinear with said secondary outlet port.

29. A vaporization apparatus in combination with an internal combustion engine, comprising:
vapor generator means for generating fuel vapor;
fuel inlet means for introducing fuel into said vapor generator means;
exhaust collection means, connected adjacent said vapor generator means, for collecting heated exhaust from said internal combustion engine and providing heat to said vapor generator means;
carburetion means for supplying a fuel-air mixture to be a manifold of said internal combustion engine;
valve means connected between said vapor generator means and said carburetion means for selectively and variably providing said fuel vapor to said carburetor means; and
idle means connected between said vapor generator means and said manifold of said internal combustion engine, for bypassing said carburetion means and providing fuel vapor directly to said manifold in an amount sufficient to provide engine idle.

30. A vaporization apparatus in combination with an internal combustion engine, comprising:
vapor generator means for generating fuel vapor;
fuel inlet means for introducing fuel into said vapor generator means;
exhaust collection means, connected adjacent said vapor generator means, for collecting heated exhaust from said internal combustion engine and providing heat to said vapor generator means;
carburetion means for supplying a fuel-air mixture to be a manifold of said internal combustion engine;
valve means connected between said vapor generator means and said carburetion means for selectively and variably providing said fuel vapor to said carburetor means;
idle means connected between said vapor generator means and said manifold of said internal combustion engine, for providing fuel vapor directly to said manifold in an amount sufficient to provide engine idle;
wherein said valve means includes a primary outlet port and a secondary outlet port; and
said carburetion means comprises a primary venturi stack and a secondary venturi stack, and a vapor tube means, extending through and across said secondary venturi stack, for providing vapor communication between said primary outlet port and said primary venturi stack.

31. A vaporization apparatus in combination with an internal combustion engine as recited in claim 30,
wherein said carburetion means further includes a depression in an outer wall thereof adjacent said secondary outlet port, and apertures within said depression through said outer wall and into said secondary venturi stack;
such that said secondary outlet port is in vapor communication with said depression and said depression is in vapor communication with said secondary venturi stack through said apertures.

32. A vaporization apparatus in combination with an internal combustion engine as recited in claim 31,
wherein said fuel inlet means introduces said fuel into said vapor generator means in an atomized form.

33. A vaporization apparatus in combination with an internal combustion engine, comprising:
vapor generator means for generating fuel vapor;
fuel inlet means for introducing fuel into said vapor generator means;
exhaust collection means, connected adjacent said vapor generator means, for collecting heated exhaust from said internal combustion engine and providing heat to said vapor generator means;
carburetion means for supplying a fuel-air mixture to be a manifold of said internal combustion engine;
valve means connected between said vapor generator means and said carburetion means for selectively and variably providing said fuel vapor to said carburetor means;
idle means connected between said vapor generator means and said manifold of said internal combustion engine, for providing fuel vapor directly to said manifold in an amount sufficient to provide engine idle; and
wherein said idle means comprises a solenoid valve which is caused to open upon a minimum temperature being reached in said vapor generator means.

* * * * *